United States Patent [19]
Schmerling et al.

[11] 3,846,503
[45] Nov. 5, 1974

[54] SATURATED HYDROCARBON ISOMERIZATION PROCESS

[75] Inventors: Louis Schmerling; Jerome A. Vesely, both of Riverside, Ill.

[73] Assignee: Universal Oil Products Company, Des Plaines, Ill.

[22] Filed: May 25, 1973

[21] Appl. No.: 364,207

Related U.S. Application Data

[62] Division of Ser. No. 258,133, May 30, 1972, abandoned.

[52] U.S. Cl. ... 260/666 P, 260/666 R, 260/666 PY, 260/113 Z
[51] Int. Cl. .......................... C07c 5/22, C07c 5/28
[58] Field of Search ....... 260/666 PY, 666 R, 666 P

[56] References Cited
UNITED STATES PATENTS

| | | |
|---|---|---|
| 2,360,699 | 10/1944 | McAllister et al. ............. 260/666 R |
| 2,428,923 | 10/1947 | Thomas et al. ................ 250/666 PY |
| 2,475,828 | 7/1949 | Farkas et al. ................... 260/666 R |
| 2,629,754 | 2/1953 | Condon............................ 260/666 R |
| 2,734,092 | 2/1956 | Schneider et al. ............. 260/666 PY |
| 2,734,093 | 2/1956 | Schneider et al. ............. 260/666 PY |
| 2,924,629 | 2/1960 | Donaldson ...................... 260/666 R |

*Primary Examiner*—Delbert E. Gantz
*Assistant Examiner*—Veronica O'Keefe
*Attorney, Agent, or Firm*—James R. Hoatson, Jr.; Thomas K. McBride; William H. Page, II

[57] ABSTRACT

A process for isomerizing an isomerizable polycyclic saturated hydrocarbon by contacting the saturated polycyclic hydrocarbon with a catalyst comprising a Friedel-Crafts metal halide mixed with a higher valence halide of a metal which forms at least two metal halides.

6 Claims, No Drawings

SATURATED HYDROCARBON ISOMERIZATION PROCESS

CROSS REFERENCE TO RELATED APPLICATIONS

This application is a division of our copending application Ser. No. 258,133, filed on May 30, 1972, now abandoned, all the teachings of which are incorporated herein by specific reference thereto.

BACKGROUND OF THE INVENTION

This invention relates to a process for isomerizing isomerizable saturated hydrocarbons. More specifically, this invention concerns a process for isomerizing an isomerizable alkane or cycloalkane utilizing a catalyst comprising a mixture of a Friedel-Crafts metal halide and a higher valence halide of a metal which forms at least two metal halides.

In many instances, it is desirable to convert hydrocarbons from one carbon chain configuration into a different carbon chain configuration. This is particularly true in the case of certain polycyclic saturated hydrocarbons, isomers of which are utilized in various petrochemical processes. Therefore, it is desirable, when starting with a non-desired polycyclic saturated hydrocarbon, to have a catalyst which is capable of effecting isomerization to provide the more desirable isomer of the polycyclic saturated hydrocarbon.

SUMMARY OF THE INVENTION

It is an object of the present invention to provide a novel method for isomerizing an isomerizable saturated hydrocarbon.

In an embodiment, the present invention relates to a process for isomerizing an isomerizable saturated hydrocarbon which comprises contacting said hydrocarbon with a catalyst comprising a Friedel-Crafts metal halide and a higher valence halide of a metal capable of possessing at least two valences, at isomerization conditions, and recovering the resultant isomerized hydrocarbon.

In a specific emdodiment, the present invention relates to a process for isomerizing cis-decahydronaphthalene which comprises contacting said cis-decahydronaphthalene with a catalyst comprising a mixture of aluminum chloride and cupric chloride at a temperature of about 0° C. to about 300° C. and a pressure of about 1 atmosphere to about 200 atmospheres, and recovering the resultant trans-decahydronaphthalene.

PREFERRED EMBODIMENTS OF THE INVENTION

The catalyst which is utilized to effect the isomerization of the isomerizable saturated hydrocarbons in the present invention consists of a mixture of a Friedel-Crafts metal halide with a higher valence halide of a metal which is capable of existing in at least two valences. Friedel-Crafts metal halides which may be used will include in particular aluminum chloride, aluminum bromide, zirconium chloride, zirconium bromide and boron trifluoride. Although boron is a metalloid, for purposes of this invention it is included within the term "metal halide." Suitable metals which are capable of existing in at least two different valence states include copper, mercury, iron, tin, lead, cobalt, molybdenum, chromium, tungsten and manganese. The various bromides and chlorides of the above metal such as mercuric chloride, mercuric bromide, cupric chloride, cupric bromide, manganese perchloride, molybdenum trichloride, molybdenum tetrachloride, molybdenum pentachloride, molybdenum tribromide, molybdenum tetrabromide, molybdenum pentabromide, chromic chloride, chromic bromide, manganese perchloride, manganese perbromide, ferric chloride, ferric bromide, cobaltic chloride, cobaltic bromide, stannic chloride, stannic bromide, lead tetrachloride, etc., are thus utilizable as a component of the catalyst. The usually preferred catalysts which are utilized in the isomerization reaction comprises mixtures of aluminum chloride and cupric chloride or zirconium chloride and cupric chloride. The aluminum chloride or zirconium chloride may be used in a catalytic amount, but are preferably used in equimolar amounts with the cupric chloride, the halides being added to the reactant alkane separately or as a previously admixed complex.

The isomerization conditions under which the reaction of the present invention is effected include a temperature of about 0°C. to about 300°C. and a pressure in the range from about 1 atmosphere to about 200 atmospheres or more. The particular temperature and pressure which are utilized depend upon the particular isomerizable reactant as well as the particular catalyst system employed. For example, when the isomerizable hydrocarbon is cyclooctane and the catalyst employed is a mixture of aluminum chloride and cupric chloride, a preferred temperature is in the range from about 20°C. to about 100°C. and a preferred pressure is in the range from about 1 atmosphere to about 100 atmospheres.

The isomerizable saturated hydrocarbons which may be employed in the process of the present invention include straight-chain paraffins such as n-butane, n-pentane, n-hexane, n-heptane, n-octane, n-nonane, n-decane, and similar higher molecular weight normal paraffins. Also suitable for use in the present process are mildly branched-paraffins such as methylpentanes, methylhexanes, methylheptanes, etc., which may be isomerized to more branched-chain paraffins. Other suitable saturated hydrocarbons include cycloalkanes such as cyclohexane, cyloheptane, cyclooctane, etc., as well as alkyl-substituted cycloalkanes, such as methylcyclohexane, methylcyclooctane, etc. Also suitable are polycyclic cycloalkanes such as, for example, decahydronaphthalene, bicyclohexyl, etc.

The process of this invention may be effected in any suitable manner and may comprise a batch or continuous-type operation. When a batch-type operation is employed, a quantity of the isomerizable saturated hydrocarbon is sealed in an appropriate apparatus such as, for example, an autoclave of the rotating or stirred variety. In addition, the particular catalyst mixture comprising a Friedel-Crafts metal halide and a higher valence halide of a metal capable of existing in at least two valances is also placed in the autoclave. Following this, the autoclave is sealed and maintained at a predetermined operating temperature which, as noted above, may be in the range from about 0°C. to about 300°C. A temperature cooler than room temperature may be provided by the use of an ice bath, and elevated temperatures may be provided by conventional heating means. After completion of a predetermined residence time, which may be from about 1 minute to about 24 hours or more in duration, the autoclave is then allowed to return to room temperature, if the reaction is effected at other than room temperature. Excess pressure, if any, is discharged and the autoclave is opened. The reaction mixture is recovered and subjected to conventional means of purification, separation and recovery, said means including hydrolysis, filtration, washing, drying, distillation, etc., whereby the desired isomerized saturated hydrocarbon is separated and recovered.

It is also comtemplated within the scope of this invention that the isomerization process may be effected in a continuous operation. One particular type of operation which may be employed is to continuously charge the isomerizable saturated hydrocarbon reactant to a reaction zone which contains the desired mixture of Friedel-Crafts metal halide and higher valence halide of a suitable metal. The reaction zone is maintained at a temperature and pressure similar to those described above in the batch operation. Inasmuch as the catalyst mixture is in solid form, the isomerizable alkane may be charged to the reaction zone containing the catalyst in either an upward, downward, or radial flow over a fixed bed of the catalyst and thereafter the isomerized product may be continuously withdrawn, separated from the reaction zone effluent, and recovered, while any unreacted isomerizable saturated hydrocarbon may be recycled to form a portion of the feed to the reaction zone. In another continuous method of operation, moving beds of reactants and catalyst are continuously passed through the reaction zone in either co-current or countercurrent operation. In addition, another type of continuous operation which may be employed is a slurry type in which the catalyst is carried into the reaction zone in admixture with the isomerizable saturated hydrocarbon.

The following examples are given to illustrate the process of the present invention. The examples are not intended to limit the generally broad scope of the present invention in strict accordance with the embodiments thereby described.

EXAMPLE I 8.3 grams of cyclooctane was placed in a glass vial with 1 gram of aluminum chloride. The vial was sealed and shaken for 1 minute and then allowed to stand at a temperature of 25°C. After standing for 5 minutes, the cyclooctane contained only a trace of ethylcyclohexane according to analysis by gas chromatography. After standing for 20.5 hours, the product was found to comprise 4 percent ethylcyclohexane and 96 percent cyclooctane.

EXAMPLE II 8.3 grams of cyclooctane and 1 gram of cupric chloride were placed in a glass vial identical to the vial used in Example I. The vial was sealed and shaken for 1 minute. The vial was then allowed to stand for 20.4 hours at a temperature of 25°C. The hydrocarbon in the vial was then recovered and analyzed. It was found to contain a trace of ethylcyclohexane and more than 99 percent of cyclooctane.

EXAMPLE III 8.3 grams of cyclooctane was placed in a glass vial identical to the vial used in Example I. 1 gram of aluminum chloride and 1 gram of cupric chloride were also introduced into the vial. The vial was sealed and shaken for 1 minute. The vial was then allowed to stand at a temperature of 25°C. After standing for 5 minutes, the hydrocarbon was found to consist of 8 percent ethylcyclohexane and 92 percent cyclooctane. After 2.8 hours, the hydrocarbon in the vial consisted of 55 percent isomerized hydrocarbons. After allowing the vial to stand for 20.3 hours, the hydrocarbon was withdrawn and analyzed. It was found to be substantially completely isomerized, and was found to comprise 42 percent ethylcyclohexane and 58 percent dimethylcyclohexane. By comparing Example III with Examples I and II, it can be seen that neither of the metal halides alone resulted in significant isomerization, but when used in combination, as taught in the process of the present invention, they resulted in substantially complete isomerization.

EXAMPLE IV 8.3 grams of cyclooctane was treated with 1 gram each of aluminum chloride and chromium chloride ($CrCl_3$) using the procedure described in Example III. After 96 hours at 25°C., the hydrocarbon was analyzed and it was found that more than 55 percent of the cyclooctane had been isomerized.

EXAMPLE V

When 8.3 grams of cyclooctane was contacted with 1 gram each of aluminum chloride and tungsten hexachloride at room temperature for 24 hours, using the procedure of Example III, at least half of the cyclooctane underwent isomerization.

EXAMPLE VI

Ten cc. of n-pentane was placed in a glass vial identical to the one used in Example I. One gram each of aluminum chloride and cupric chloride were also placed in the vial. The vial was sealed and shaken, then allowed to stand for 48 hours at a temperature of 25°C. The vial was then opened and the gaseous content thereof allowed to flow into a trap cooled to −78°C. The condensed product was recovered. The liquid hydrocarbons in the vial were also recovered, and both the gaseous and liquid material were analyzed. The product was found to comprise 67 percent n-pentane, 24 percent isopentane, 5 percent methylpentane, 3 percent isobutane and 1 percent n-butane.

EXAMPLE VII

Ten cc. of decahydronaphthalene was placed in a glass vial like the one employed in Example I. The decahydronaphthalene utilized had been analyzed previously and found to consist 50 percent of the cis-isomer and 50 percent of the trans-isomer. One gram of aluminum chloride and 1 gram of cupric chloride were also placed in the vial, which was then sealed and shaken. The vial was then allowed to stand at a temperature of 25°C. for 23 hours. The contents of the vial were then removed and analyzed. The hydrocarbons were found to consist of decahydronaphthalene, of which 90 percent was the trans-isomer and 10 percent the cis-isomer.

EXAMPLE VIII n-Heptane (50 grams) was stirred at room temperature with 13.5 grams each of aluminum chloride and cupric chloride for 7 hours. The mixture was then allowed to stand for 16 additional hours, after which it was analyzed by gas chromatography. It was found that over 60 percent of the n-heptane had been isomerized and cracked to lower boiling hydrocarbons.

EXAMPLE IX

Two experiments were carried out with zirconium chloride using the procedures of Examples I and III. In the first, 1 gram of zirconium chloride was added to 8.3 grams of cyclooctane in a vial, which was sealed and shaken for 1 minute and then warmed at 80–85°C. for 96 hours. The product contained only a trace of hydrocarbons other than cyclooctane. In the second experiment, 1 gram each of zirconium chloride and cupric chloride were added to 8.3 grams of cyclooctane in an identical vial, and the mixture was treated in the same manner as the mixture in the first experiment with zirconium chloride. After 96 hours, the hydrocarbon product was analyzed and it was found that isomerization was over 55 percent complete from the original cyclooctane.

We claim as our invention:

1. A process for isomerizing a saturated hydrocarbon selected from the group consisting of cyclohexane, cycloheptane, cyclooctane, methylcyclohexane, methylcyclooctane, decahydronaphthalene and bicyclohexyl, which comprises contacting said hydrocarbon, at a temperature of from about 0°C. to about 300°C. and a pressure of from about 1 atmosphere to about 200 atmospheres, with a Friedel-Crafts metal halide selected from the group consisting of aluminum and zirconium chlorides and bromides and boron trifluoride in admixture with a chloride or bromide of copper in the cupric valence state, chromiun in the chromic valence state, or tungsten in its +6 valence state, and recovering the resultant isomerized hydrocarbon.

2. The process of claim 1 further characterized in that said saturated hydrocarbon is cyclooctane.

3. The process of claim 1 further characterized in that the metal halides are aluminum chloride and cupric chloride.

4. The process of claim 2 further characterized in that the metal halides are aluminum chloride and cupric chloride.

5. The process of claim 2 further characterized in that the metal halides are aluminun chloride and chromic chloride.

6. The process of claim 2 further characterized in that the metal halides are aluminum chloride and tungsten hexachloride.

* * * * *